UNITED STATES PATENT OFFICE.

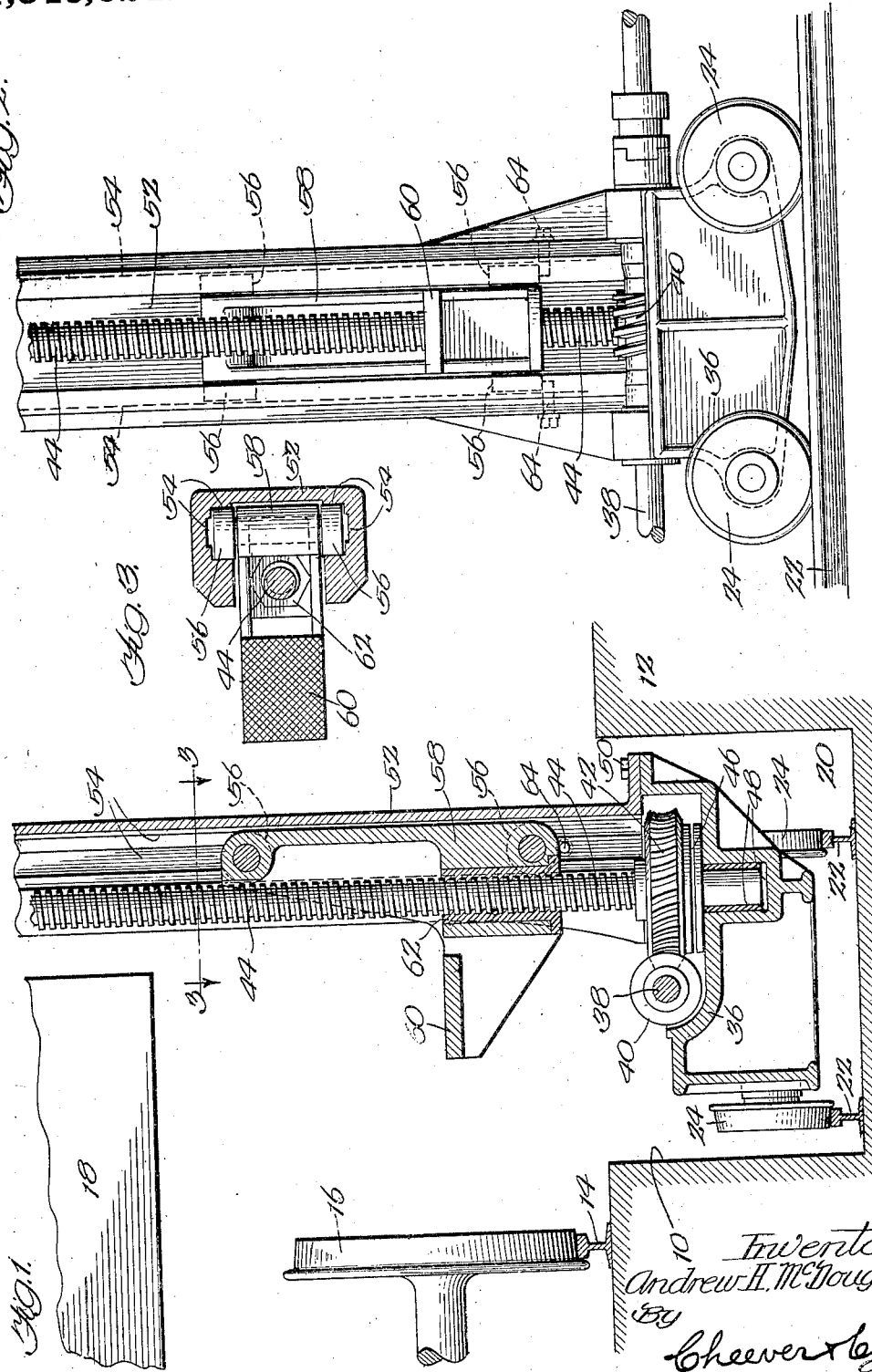

ANDREW H. McDOUGALL, OF HARVEY, ILLINOIS, ASSIGNOR TO WHITING FOUNDRY EQUIPMENT COMPANY, OF HARVEY, ILLINOIS, A CORPORATION OF ILLINOIS.

CAR-HOIST.

1,346,324.

Specification of Letters Patent. Patented July 13, 1920.

Application filed March 17, 1919. Serial No. 283,104.

*To all whom it may concern:*

Be it known that I, ANDREW H. McDOUGALL, a citizen of the United States, residing at Harvey, in the county of Cook and State of Illinois, have invented a certain new and useful Improvement in Car-Hoists, of which the following is a specification.

This invention relates to mechanism movable along the side of a regular railroad track, adapted to, in that class of cases in which a lifting bar supportable in opposite ends cannot be passed entirely under the object to be lifted, engage and lift a car body off from its track or other support. The object of the invention is to provide on a supporting truck or the like, adapted for movement adjacent to the car to be lifted, a screw jack lifting mechanism adapted to raise heavy loads, the same being so arranged and proportioned with reference to the supporting truck that it maintains its own balance whether loaded or unloaded, and so does not tip the truck over, and in which the arrangement of parts is so adjusted that the screw lifting mechanism operates sufficiently and comparatively easily.

The invention consists in mechanism for carrying out the foregoing objects, which can be easily and cheaply made, which is satisfactory in operation and not readily liable to get out of order. More particularly, the invention consists in the features and details of construction hereafter more fully set forth in the specification and claims.

Referring to the drawings, in which similar numerals indicate the same parts throughout the several views, Figure 1 is an elevation taken transversely to the railroad track and the adjacent lifting mechanism of this invention, certain of the parts being shown in section.

Fig. 2 is a side view of the lifting mechanism and its supporting truck taken from the right as viewed in Fig. 1.

Fig. 3 is a plan view taken on the line 3—3 of Fig. 1.

In installing the device of this invention in a car shop or factory, it is desirable to provide a suitable foundation 10—12 of concrete or other suitable construction, along which the rails 14 of an ordinary railroad track (only one appearing in the drawing) are laid. On this railroad track the wheels 16 of the car whose body 18 is to be lifted pass. This foundation 10—12 is provided adjacent to the side of a car 18 located upon track 14 with an elongated recess or pit 20 in whose bottom are laid rails 22 of a supplemental track on which travel the wheels 24 of a truck or trolley 36 to carry the lifting mechanism hereafter described. In the complete equipment at least four such trucks with lifting mechanism are provided, one for each corner of the car to be lifted, but for the purposes of this application only one needs to be and is shown. The trolley is provided with some sort of power for driving the lifting mechanism. In the case here illustrated, this takes the following form:

Extending longitudinally of the track 22 is a horizontal shaft 38 supplied with power from any suitable source, not shown, adapted, by mechanism hereafter described, to operate the lifting mechanism of this invention to elevate car body 18 off from wheels 16. This shaft 38 may also, by mechanism well known in the art and forming no part of this invention, and therefore not shown, be adapted to propel the trolley 36 and its attached wheels 24 along the track 22 parallel to railroad track 14.

Shaft 38 carries a pinion 40 with which meshes a horizontally disposed worm wheel 42 which in turn supports and drives vertical screw-threaded shaft 44. The worm wheel 42 is supported upon anti-friction bearings 46 and the lower end of the shaft 44 is journaled in a step bearing 48 formed in the frame of trolley 36, similar to those heretofore used in the art.

Rising from the trolley frame and secured thereto by any suitable means, such as bolts 50, is a housing 52 having formed therein oppositely disposed vertical track-ways 54. Traveling in these track-ways are the wheels or rollers 56 journaled upon and supporting the frame of the lifting bracket 58 from which protrudes the lifting hook 60 which, in operation, slips under and ultimately lifts the car body 18. The screw 44, heretofore described, is directly or indirectly threaded into this lifting bracket 58 to propel it up and down. In the particular construction here shown, the screw 44 is threaded into a nut 62 which in turn engages the bracket 58 in a non-circular opening and is separable therefrom for safety purposes when the bracket 58 in its downward movement engages stop screws 64; this in the manner more fully shown, described and claimed in my prior application, Serial No. 273,236, already on file in the Patent Office.

As the lifting mechanism is of the class which engages only one edge of the car and there is no cross bar running to another truck to steady the lifting mechanism, it has to all be balanced on the truck so that the center of gravity of the lifting mechanism is always between the wheels 24 and as near the middle distance between them as possible in all conditions of load and unload of the device. It is, therefore, important to note that the screw 44 is located between the track-ways 54 and the hook 60 which is necessarily at approximately the center of the truck, thereby reducing the thrust of the load upon the screw 44 and the consequent inefficiency of the screw resulting therefrom; also, that by getting the screw 44 as close as possible to the hook 60, the center of gravity of the shaft 38, the worm wheel 42, the screw 44, all heavy parts, is brought much nearer and lower down in the center of the truck than would be possible were the rollers 56 between the screw and the hook 60, and the screw consequently located at the extreme edge of the truck.

The device will stand up as long as the center of gravity of the whole thing is between the truck wheels, but much better loading and satisfactory work is obtained if it is kept near the center.

Having thus described my invention, what I claim as new and desire to secure by Letters Patent, is:—

1. In mechanism of the class described, a traveling wheeled truck or trolley, a load engaging lifting member provided with wheels only one above the other movable vertically of said truck, a vertical lifting screw located between said wheels and the load engaging portion of the lifting member engaging and propelling said lifting member, means for rotating said screw, a vertical housing, adjacent to the screw inclosing opposite vertical sides of said wheels, in which the lifting member travels positioned to relieve the screw of part of the thrust created when a load is engaged by the lifting member, said three enumerated parts being so mounted on the trolley that the path of travel of that part of the lifting member which engages the load is in approximately the central vertical axis of the truck, and that the center of gravity of the device is inside the wheels of the truck.

2. In mechanism of the class described, in combination with a traveling truck, a horizontally disposed drive wheel located on said truck, means for rotating said drive wheel, a lifting screw rising from the center of said drive wheel and rotated thereby, a lifting member propelled by said screw having on one side thereof a hook member for engaging a load and on the other side means adapted to travel in a housing arranged to take the thrust of the load off from the screw, and such a housing rising from the truck parallel to and on one side of screw there taking care of the thrust of all portions of the lifting member, the whole arranged so that the hook member travels in a vertical line approximately through the center of gravity of the truck.

3. In mechanism of the class described, in combination with a traveling truck, a horizontally disposed drive wheel located on said truck, means for rotating said drive wheel, a lifting screw rising from the center of said drive wheel and rotatable thereby, a lifting member propelled by said screw having on one side thereof a hook member for engaging a load and on the other side means adapted to travel in a housing arranged wholly on that side of the screw to take the thrust of the load off from the screw, and such a housing rising from the truck parallel to the screw, the whole so arranged that the hook member travels in a vertical line approximately through the center of gravity of the truck, the screw being next to it and the housing being further from the hook.

4. In mechanism of the class described, a traveling truck or trolley, a horizontal shaft extending lengthwise of the truck at approximately its center, a horizontal worm wheel located at one side of said shaft, means whereby said shaft drives said worm wheel, a vertical lifting screw rising from the trolley at the center of the worm wheel by which it is driven, a housing mounted on and carried by the trolley rising adjacent to the screw, a load carrying member adapted to be driven vertically of the housing by the lifting screw, provided with a load engaging portion adapted to travel in a vertical line which is approximately in the center of gravity of the truck and with bearing portions sliding in a track formed in the housing, said track lying in a plane more remote from the path of travel of the hook than the lifting screw.

In witness whereof, I have hereunto subscribed my name in the presence of two witnesses.

ANDREW H. McDOUGALL.

Witnesses:
DWIGHT B. CHEEVER,
M. S. ROSENZWEIG.